(12) United States Patent
Johnson et al.

(10) Patent No.: US 6,311,916 B1
(45) Date of Patent: Nov. 6, 2001

(54) LEADER BLOCK ASSEMBLY FOR A DATA STORAGE TAPE CARTRIDGE

(75) Inventors: Michael W. Johnson, Cottage Grove; G. Phillip Rambosek, Shafer, both of MN (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/541,130

(22) Filed: Mar. 31, 2000

(51) Int. Cl.⁷ ................................................. G11B 15/66
(52) U.S. Cl. ........................... 242/332.8; 242/587.1; 242/348.2
(58) Field of Search ................................. 242/332, 332.8, 242/348, 348.2, 600, 613, 587, 587.1, 587.2, 587.3; 360/95, 132

(56) References Cited

U.S. PATENT DOCUMENTS

| | | |
|---|---|---|
| 4,775,115 | 10/1988 | Gelardi . |
| 5,155,639 | 10/1992 | Platter et al. . |
| 5,232,180 * | 8/1993 | Hoge et al. ....................... 360/95 X |
| 5,261,626 | 11/1993 | Hoge et al. . |
| 5,303,875 | 4/1994 | Hoge et al. . |
| 5,443,220 * | 8/1995 | Hoge et al. ....................... 242/332.8 |
| 5,465,187 | 11/1995 | Hoge et al. . |
| 6,082,652 * | 7/2000 | Theobald ....................... 242/332.8 X |
| 6,142,402 * | 11/2000 | Reilly ............................. 242/332.8 |

\* cited by examiner

Primary Examiner—William A. Rivera
(74) Attorney, Agent, or Firm—Eric D. Levinson

(57) ABSTRACT

A leader block assembly for use with a data storage tape cartridge. The leader block assembly is configured to hold a free end of a storage tape and includes a generally rectangular body having opposing sides, a leading end, a trailing end terminating in an end surface, and first and second ears. The ears are formed in an opposing fashion at the trailing-end and extend radially relative to the sides along a substantial portion of a width of the trailing end. In this regard, the cars are configured to substantially prevent longitudinal sliding movement of the end surface upon insertion of the leader block assembly into a tape drive take-up reel. In one preferred embodiment, the leader block assembly includes a base block and a tape clamp, with the first ear being formed on the base block and the second ear being formed on the tape clamp.

20 Claims, 4 Drawing Sheets

LEADER BLOCK ASSEMBLY FOR A DATA STORAGE TAPE CARTRIDGE

BACKGROUND OF THE INVENTION

The present invention relates to a leader block assembly for a data storage tape cartridge. More particularly, it relates to a leader block configured for preventing leader block impressions on data storage tapes.

Data storage tape cartridges have been used for decades in the computer, audio, and video fields. The data storage tape cartridge continues to be an extremely popular form of recording large volumes of information for subsequent retrieval and use.

A data storage tape cartridge generally consists of an outer shell or a housing maintaining at least one tape reel assembly and a length of magnetic storage tape. The storage tape is wrapped about a hub portion of the tape reel and is driven through a defined tape path by a driving system. The housing normally includes a separate cover and a base, the combination of which forms an opening (or window) at a forward portion thereof for allowing access to the storage tape by a read/write head upon insertion of the data storage tape cartridge into a tape drive.

In a reel-to-reel magnetic tape drive, a free end of the storage tape is directed away from the housing of the data tape cartridge to an adjacent area at which the read/write head is located. The free end of the storage tape of the data tape cartridge is typically secured to a leader block for assisting guidance of the storage tape. In particular, the leader block is removably inserted into a drive take-up reel (separate from the data storage tape cartridge) and the storage tape from the cartridge is wound about the drive take-up reel as data is accessed/recorded from the tape by the adjacent read/write head.

As shown in FIGS. 1–2, a conventional leader block 10 includes a generally rectangular body 12 defining a trailing end 14 and a leading end 16. The trailing end 14 terminates in an end surface 18. Prior art leader block 10 further includes opposite sides 20 and edges 21 with T-shaped protrusions 22 configured for reciprocally engaging a slot of a drive take up reel to removably secure the leader block 10 relative to the drive take-up reel.

As shown in FIG. 3, a conventional drive take-up reel 30 includes a ringshaped hub 32 and opposing flanges 34. The hub 32 defines a tape-winding surface 36, about which the storage tape (not shown) is wound, and a slot 38. The slot 38 is adapted for receiving the leader block 10. The flanges 34 define a pair of notches 40 contiguous with the edges of the slot 38 for receiving the protrusions 22 of the leader block 10. As further shown in FIG. 4, the slot 38 is defined by opposing sidewalls 41, while the notch 40 of each flange 34 further includes a shelf 42 and a channel 44.

During use, the leader block 10 is inserted into the slot 38 of the drive take-up reel 30, with the opposite sides 20 of the leader block 10 being slidingly received by sidewalls 41 of the slot 38 of the take-up reel 30. Upon further insertion of the leader block 10, the T-shaped protrusions 22 are supported by the shelf 42 of the notches 40 to resist further sliding movement of leader block 10 radially inward relative to the slot 38. This interaction attempts to maintain the end surface 18 of the leader block 10 in a generally flush relationship with the tape-winding surface 36 of the drive take-up reel 30. Accordingly, all of the radial support for the leader block 10 occurs at the notches 40 of the flanges 34 at the edges of hub 32 (see FIG. 3).

Following insertion, the data storage tape (not shown) is wound about the hub 32. In theory, a radius of the end surface 18 of the leader block 10 "matches" a radius of the hub 32. However, as the amount of wrapped tape increases, a substantial pressure is exerted radially inward on the leader block 10, causing a significant middle portion of the end surface 18 to bow or sag radially inward relative to the tape-winding surface 36. This sagging occurs because the notches 40 provide relatively little radial support for the leader block 10. This sagging results in a mismatch or a gap between the end surface 18 of the leader block 10 and the tape-winding surface 36. As the data storage tape is further wound about the hub 32, the storage tape is forced into or fills the gap, creating impressions in the storage tape (or "leader block impressions"). These leader block impressions may reduce the storage capacity of the data storage tape, and possibly permanently damage the storage tape.

The ability of a leader block to remain properly seated into a drive takeup reel has a very large affect on likelihood of the leader block impressions and their transfer through the storage tape. If these leader block impressions are severe, they will transmit through many feet of tape, reducing the data transfer and storage capacity of the cartridge. Currently, to overcome the problem of leader block impressions, more tape is added to the data tape cartridge and drive software is programmed to move the start of data transfer away from the beginning of the tape (at which leader block impressions are most prevalent). Advancements in storage tape media have resulted in highly thin tape.

The decreased thickness tape is even more susceptible to any winding surface mismatch and the ensuing leader block impressions that transfer through the tape wound on the drive take-up reel. Accordingly, the longstanding problem of leader block impressions in data storage tape threatens to nullify the gains obtained by recently available, thinner storage tapes. Moreover, the problem of leader block impressions still requires remedial adjustments such as software changes and intentionally not using portions of the data storage tape.

Data storage tape cartridges are important tools used to maintain vast amounts of information. To remain competitive, data storage tape cartridge manufacturers must continually improve cartridge performance while reducing manufacturing costs. Solving leader block impressions in data storage tapes remains a challenge.

SUMMARY OF THE INVENTION

One aspect of the present invention provides a leader block assembly for holding a length of data storage tape and for use with a tape drive take-up reel. The leader block assembly includes a generally rectangular body having opposing sides, a leading end, a trailing end terminating in an end surface, and first and second ears. The ears are formed at the trailing end and extend radially relative to the sides along at least a substantial portion of a width of the trailing end. More particularly, the ears are configured to substantially prevent longitudinal sliding movement of the end surface upon insertion of the leader block assembly into a drive take-up reel. In a preferred embodiment, each of the ears forms a transverse contact surface configured to engage a corresponding surface associated with a take-up reel. The transverse contact surfaces each define a length preferably approximating a width of the trailing end. During use, the leader block assembly, and in particular, the end surface is supported by the ears along at least a substantial portion of the width of the trailing end.

Another aspect of the present invention relates to a data storage tape cartridge. The data storage tape cartridge includes a housing, at least one tape reel, a storage tape, and a leader block assembly. The housing defines an enclosure. The tape reel is disposed within the enclosure and includes a hub and opposing flanges. The storage tape is wound about the hub. Finally, the leader block assembly is secured to a free end of the storage tape. The leader block assembly includes a generally rectangular body having opposing sides, a leading end, a trailing end terminating in an end surface, and first and second cars. The cars are formed at the trailing end and extend radially relative to the sides along a substantial portion of a width of the trailing end. With this in mind, the ears are configured to substantially prevent longitudinal sliding movement of the end surface upon insertion of the leader block assembly into a tape drive take-up reel. In one preferred embodiment, the leader block assembly includes a base block and a tape clamp.

Yet another aspect of the present invention relates to a combination takeup reel and leader block assembly for use in a tape drive system. The take-up reel includes a hub and a pair of opposing flanges extending outwardly from the hub. The hub includes an outer, tape-winding surface and a slot formed in the hub extending generally perpendicular to the tape-winding surface. The slot terminates in an engagement zone adjacent the tape-winding surface and includes opposing transverse ledges. The leader block assembly is a generally rectangular shaped body configured to be insertable into the slot of the take-up reel. The leader block assembly includes a leading end, a trailing end, opposing sides, and a pair of ears positioned at the trailing end. Each of the ears includes a transverse contact surface extending from the respective side. With this configuration, upon insertion of the leader block assembly into the take-up reel slot, the trailing end is positioned within the engagement zone. More particularly, the transverse contact surfaces of the ears engage the transverse ledges of the slot, respectively, to prevent longitudinal sliding movement of the leader block assembly, and in particular the end surface, radially inwardly relative to the tape-winding surface. In one preferred embodiment, the leader block assembly is supported by the engagement zone along at least a substantial portion of a width of the leader block assembly, thereby providing an increased interface area.

DESCRIPTION OF THE PREFERRED EMBODIMENTS

A leader block assembly or leader block in accordance with the present invention is ordinarily deployed within a reel-to-reel magnetic tape drive system including a drive take-up reel and a data storage tape cartridge that carries a data storage tape. The leader block is removably secured onto a free end of the data storage tape, which is selectively removable from the cartridge. Accordingly, the leader block in accordance with the present invention will be described in the context of a data storage tape cartridge and reel-to-reel tape drive system.

Figure 5:
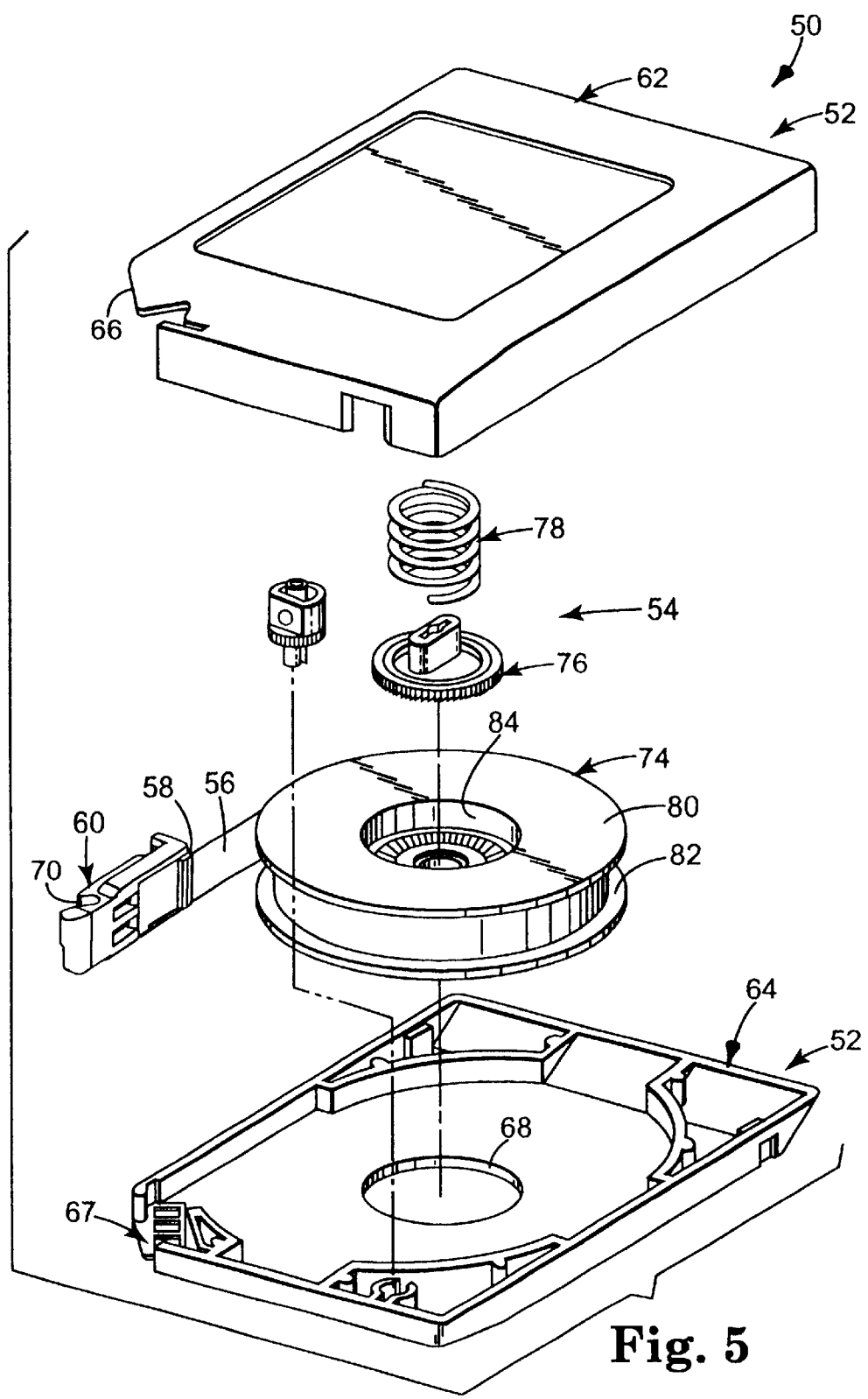
FIG. 5 is an exploded, perspective view of a data storage tape cartridge in accordance to the present invention.

One preferred embodiment of a data storage tape cartridge 50 in accordance with the present invention is shown in FIG. 5. Generally speaking, the data storage tape cartridge 50 includes a housing 52, a tape reel assembly 54, and a storage tape 56. The tape reel assembly 54 is disposed within the housing 52. The storage tape 56, in turn, is wound around the tape reel assembly 54 and includes a free end 58 attached to a leader block assembly 60 of the present invention.

The housing 52 is preferably sized to be received by a typical tape drive (not shown). Thus, the housing 52 can assume a form factor size of approximately 125 mm×110 mm×21 mm, although other form factors or dimensions are equally acceptable. With this in mind, the housing 52 is defined by a first housing section 62 and a second housing section 64. In one preferred embodiment, the first housing section 62 forms a cover, whereas second housing section 64 serves as a base. It should be understood that as used throughout the Specification, directional terminology, such as "cover," "base," "upper," "lower," "top," "bottom," etc., are used for purposes of illustration only, and are in no way limiting.

The first and second housing sections 62, 64 are configured to be reciprocally mated to one another and are generally rectangular except for one corner 66 that is angled and forms a leader block window 67. The leader block window 67 is configured to hold the leader block 60 and serves as an opening for the storage tape 56 to exit from the housing 52 such that the storage tape 56 can be threaded through a tape drive (not shown) when the leader block 60 is removed from the leader block window 67. Conversely, when the leader block 60 is snapped into the leader block window 67, the leader block window 67 is covered. As described in greater detail below, a leading end of the leader block 60 forms a slot 70 for engaging an automatic threading apparatus of a reel-to-reel magnetic tape drive apparatus (not shown) and engages an inclined surface of the corner 66 of the housing 52.

In addition to the leader block window 67, the second housing section 64 further forms a central opening 68. The central opening 68 facilitates access to the tape reel assembly 54 by a drive chuck portion of a tape drive (not shown).

The tape reel assembly 54 is known in the art and generally includes a tape reel 74, a brake 76 and a spring 78. The tape reel 74 includes an upper flange 80, a lower flange 82 and a ring-shaped hub 84, and is sized to coaxially receive the brake 76 and the spring 78. The storage tape 56 is wound about the hub 84, constrained laterally by the flanges 80, 82. As is known in the art, the brake 76 and the spring 78 selectively "lock" the tape reel 74 to the housing 52 when the cartridge 50 is not in use.

he storage tape 56 is preferably a magnetic tape of a type commonly known in the art. For example, the storage tape 56 may consist of a balanced polyethylene naphthalate (PEN) based material coated on one side with a layer of magnetic material dispersed within a suitable binder system, and on the other side with a conductive material dispersed in suitable binder system. Acceptable magnetic tape is available, for example, from Imation Corp. of Oakdale, Minn.

Figure 6:
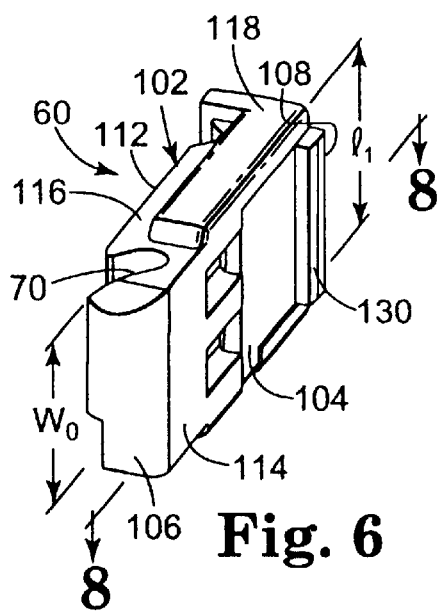
FIG. 6 is bottom perspective view of a leader block assembly of the data storage tape cartridge of FIG. 5.
Figure 7:
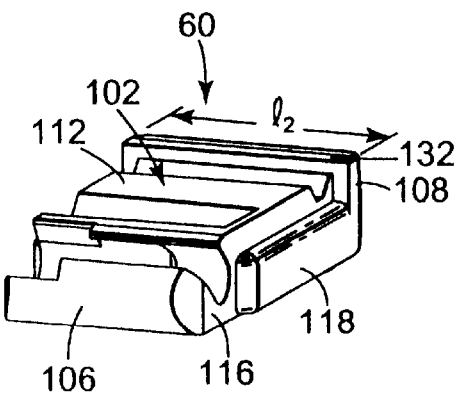
FIG. 7 is a top perspective view of the leader block assembly of FIG. 6.

FIGS. 6–7 are perspective views of the leader block assembly 60 in accordance with one preferred embodiment of the present invention. The leader block assembly 60 is generally rectangular and includes a base block 102 and a tape clamp 104. The base block 102 and the tape clamp 104 combine to define a leading end 106, a trailing end 108, a first side 112, a second side 114, edges 116, and generally L-shaped protrusions 118. The leader block assembly 60 further includes a first projection or ear 130, disposed on the tape clamp 104 adjacent the trailing end 108, and a second projection or ear 132, disposed on the base block 102 adjacent the outer end 108. The leader block assembly 60 preferably is made from a polycarbonate material including about ten percent of a polytetrafluoroethylene material (commonly sold as Teflon®). Alternatively, other materials known in the art are equally acceptable. The leader block 60 has a width ($w_0$) that is generally equal to a width of a hub of a drive take-up reel and to a width of the storage tape 56.

Figure 8:
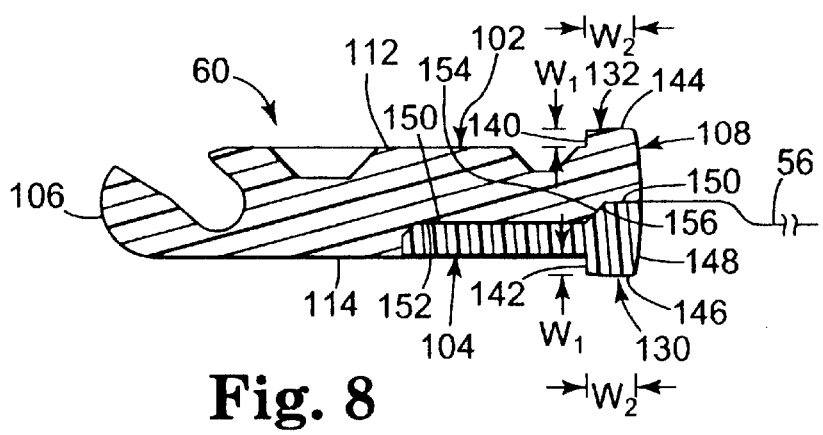
FIG. 8 is a cross-sectional view of the leader block of FIG. 6 in accordance with the present invention.

The features of the ears 130 and 132 are shown in greater detail in FIG. 8. The second ear 132 defines a first transverse contact surface 140 and a first lateral contact surface 144; whereas the first ear 130 defines a second transverse contact surface 142 and a second lateral contact surface 146. Each of the respective contact surfaces 140, 142, 144, 146 of the ears 130, 132 are sized and shaped for removable engagement with a slot portion of a drive take-up reel (not shown), as described below.

In one preferred embodiment, each of the transverse surfaces 140 and 142, have a width $w_1$ of about 0.044 inches so that each ear 130 and 132 effectively extends about 0.040 inches outwardly (or transversely) from the respective sides 112, 114. The preferred 0.040 inch width provides a maximum surface area for engaging a slot of a drive take-up reel hub (not shown) while satisfying other constraints associated with the leader block window 67 (FIG. 5) previously described. Alternatively, however, other dimensions for the transverse surfaces 140, 142 are equally acceptable.

In one preferred embodiment, the lateral surfaces 144 and 146 have a width $w_2$ of about 0.125 inch. As described below, the width $w_2$ corresponds with a spacing provided by a take-up reel slot (not shown) and dictates a final position of the leader block 60 relative to the take-up reel. As such, other dimensions may be employed.

Finally, the ears 130, 132 have lengths (l1 and l2 as seen in FIGS. 6–7) that are generally commensurate with a width (wo) of the leader block assembly 60 and generally equal to a width (or height) of a drive take-up reel but (not shown), preferably on the order of 0.7 inch. Having relatively long ears 130, 132 that match a full width of a drive take-up reel hub creates a large surface area for the leader block 60 to lodge against, and be fully supported within, the slot of the drive take-up reel. While the length of ears 130, 132 are preferably generally equal, ears 130, 132 need not have lengths that are exactly equal to each other.

For example, as best seen in FIGS. 6–7, in one preferred embodiment the first ear 130 has a length ($l_1$) substantially equal to a width of the tape clamp 104 but less than a full width ($w_0$) of base block 102. The second ear 132 has a length (l2) that is slightly longer than the length of the first ear 130 and that is substantially equal to the full width $w_0$ of the leader block 60 assembly (optionally including an extra width provided by the L-shaped protrusions 118 on the edges 116). This small length discrepancy in the ears 130, 132 results from the molding process used to make the leader block 60, in which the tape clamp 104 that carries the first ear 130 is molded separately from the base block 102, which carries the second ear 132. Moreover, the second ear 132 preferably is molded contiguously with the L-shaped edge protrusions 118, which optionally provides the extra width for the second car 132 relative to a main portion of the base block 102.

Figure 1:
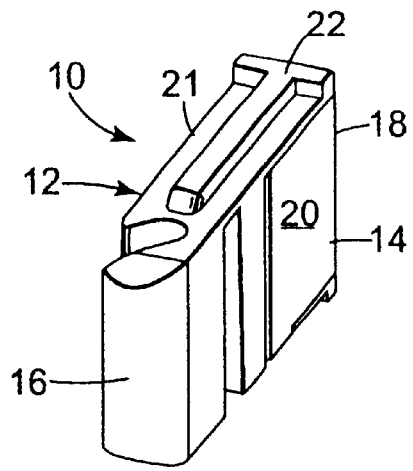
FIG. 1 is bottom perspective view of a prior art leader block assembly of a data storage tape cartridge.
Figure 2:
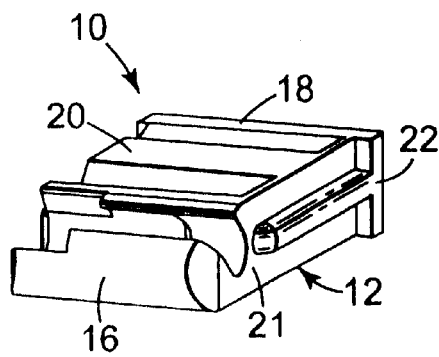
FIG. 2 is a top perspective view of the prior art leader block assembly of FIG. 1.
Figure 3:
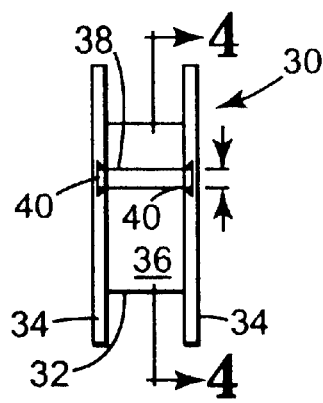
FIG. 3 is a top view of a prior art drive take-up reel.
Figure 4:
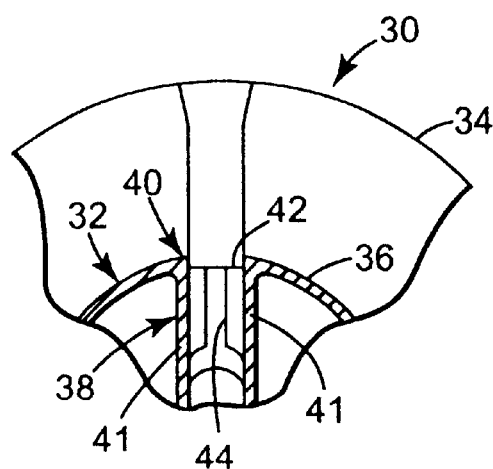
FIG. 4 is a partial cross-sectional view of the prior art drive take up reel assembly of FIG. 3.

Of course, putting aside manufacturing limitations or preferences, the first ear 130 preferably has a length generally equal to that of the second ear 132, and both the ears 130, 132 preferably have a length generally equal to a full width $w_0$ of the leader block assembly 60. Moreover, either or both the ears 130 and 132 optionally can have a length somewhat less than the full width $W_0$ of the leader block 60 and still provide the main advantages of the present invention that result from using relatively larger hub-engaging projections rather than the relatively small, prior art flange-engaging protrusions (e.g., the protrusions 22 in FIGS. 1 and 2). Of particular importance is a length of the transverse contact surfaces 140, 142. As described below, the transverse surfaces 140, 142 provide a surface area for interfacing/abutting corresponding portions of a take-up reel hub. As such, the transverse surfaces 140, 142, are each preferably continuous, having a length approximating a width of the take-up reel hub. Alternatively, the transverse surfaces 140, 142 can each include a two or more spaced projections, and can define a length $l_1$, $l_2$ less than the width $w_0$ of the leader block assembly 60. Preferably, one or both of the transverse surfaces 140, 142 have a length that is at least 50% of the leader block 60 width $w_0$.

As further shown in FIG. 8, the base block 102 defines a tape-engaging surface 150 with an angled portion 154, while the tape clamp 104 includes a corresponding tape-engaging surface 152 with an angled portion 156, for holding the storage tape 56 therebetween. The angled portions 154, 156 preferably define an angle of about 45° to 50° relative to a longitudinal axis of the leader block 60, and provide a junction with the main portion of the tape-engaging surfaces 150 and 152 to accentuate the gripping action on the data storage tape 56. In this regard, a snap-fit is preferably achieved between the base block 102 and the tape clamp 104 for maintaining the storage tape 56. Alternatively, or in addition, other clamping arrangements may be included, including an adhesive.

Finally, as also shown in FIG. 8, the trailing end 108 terminates in an end surface 148. The end surface 148 is rounded to form an arcuate shape having a radius of curvature that substantially matches a radius of curvature of a tape-winding surface tape of a drive take up reel hub (not shown), as described below. The curved end surface 148 of the leader block 60 is further illustrated in FIG. 9.

Figure 9:
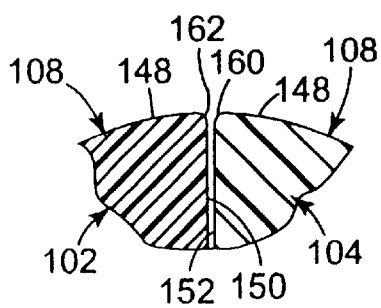
FIG. 9 is an enlarged cross-sectional view of an end surface of the leader block assembly of FIG. 6 in accordance with the present invention.

FIG. 9 is an enlarged partial sectional view of the trailing end 108, including the end surface 148. The end surface 148 is defined by an intersection of the base block 102 and the tape clamp 104. To this end, at the trailing end 108, the tape clamp 104 forms a rounded corner 160 and the base block 102 forms a rounded corner 162. The corners 160, 162 define opposite sides of an exit area for the storage tape 56 (FIG. 8) and each corner 160, 162 preferably has a radius of curvature of about 0.010 inches, although other dimensions are acceptable. During use, the storage tape 56 is wrapped about one of the corners 160, 162 (depending upon the rotational directional of wrapping about a take-up reel). By forming the corners 160, 162 to be arcuate, the rounded corners 160, 162 reduce strain on the storage tape and thereby reduce the chance of tape breakage. However, by preferably incorporating a relatively small radius of curvature, upon final assembly, the corners 160, 162 are close enough to each other to minimize a potential gap between the base block 102 and the tape clamp 104 at the end surface 148.

Figure 10:
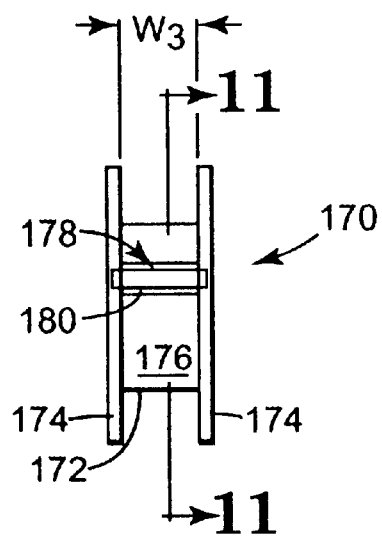
FIG. 10 is a top view of a drive take-up reel assembly in accordance with the present invention.

During use, the leader block assembly 60 (and the attached storage tape 56) is fed from the cartridge 50 (FIG. 5) to a tape drive take-up reel, such as take-up reel 170 of FIG. 10. The drive take-up reel 170 includes a ring-shaped hub 172 secured between opposing flanges 174. The hub 172 includes a tape winding surface 176 and a slot 178 terminating a leader block engagement zone 180. The engagement zone 180 preferably has a width $w_3$ substantially equal to a width (or height) of the hub 172. The large width of the block engagement zone 180 provides a much greater surface area (up to ten times as much) for engaging a portion of the leader block 60 than the prior art configuration in which the small notches 40 on the flanges 34 alone were relied upon for engaging the small T-shaped edge protrusion 22 on the leader block 10 (see FIGS. 1–4).

Figure 11:
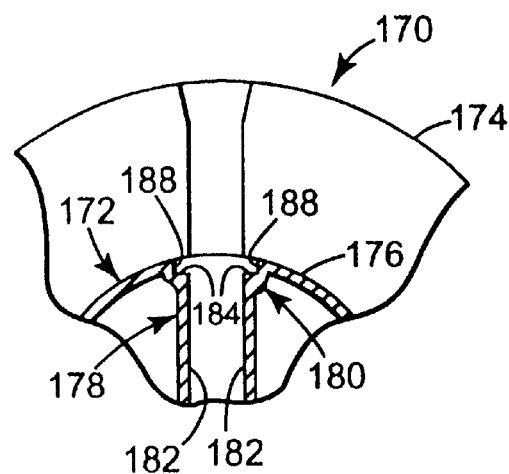
FIG. 11 is a partial cross-sectional view of the drive take-up reel assembly of FIG. 10.

As shown in FIG. 11, the slot 178 further includes opposing sidewalls 182 and the leader block engagement zone 180 includes radial or transverse ledges 184 and lateral support surfaces 188. With additional reference to FIG. 12, opposing sidewalls 182 are spaced apart a sufficient distance to slidingly receive the leader block 60. The ledges 184 are each sized and shaped for receiving and supporting the first ear 130 and the second car 132. The lateral support surfaces 188 are each sized and shaped for receiving and laterally supporting the first ear 130 and the second ear 132.

Figure 12:
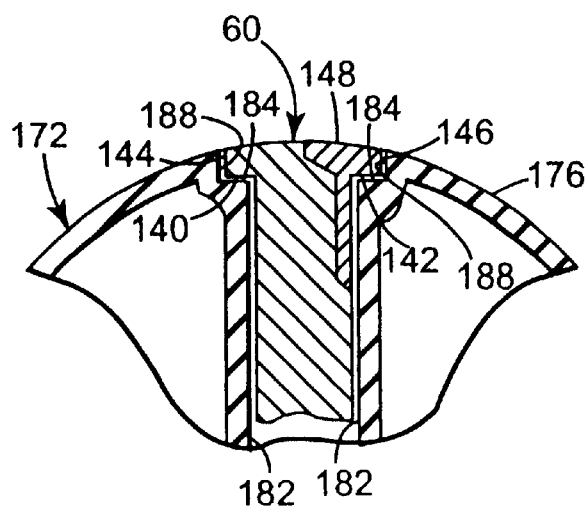
FIG. 12 is an enlarged cross-sectional view of the leader block assembly of FIG. 6 as removably inserted into the drive take-up reel assembly of FIG. 10 in accordance with the present invention.

In particular, upon insertion of the leader block assembly 60 as shown in FIG. 12, the trailing end of the leader block assembly 60 is placed within, and supported by, the engagement zone 180. For example, the ledges 184 of the engagement zone 1 80 receivingly engage and support the first and second transverse contact surfaces 140, 142 of the ears 130, 132, respectively. This contact prevents any further sliding movement of the leader block assembly 60 radially inward relative to the tape-winding surface 176. Moreover, the lateral support surfaces 188 of the engagement zone 180 laterally support the lateral contact surfaces 144, 146 of the ears 130, 132, respectively. This contact prevents any lateral sliding movement of the leader block assembly 60 within the slot 178 relative to a direction of tape winding along the tape-winding surface 176. In addition, an extension of the lateral support surfaces 188 from the ledges 184 corresponds with the width $W_2$ of the lateral contact surfaces 144, 146 (best shown in FIG. 8) such that the end surface 148 of the leader block assembly 60 is substantially flush with the tape-winding surface 176 of the drive take-up reel 170. In particular, the interaction between the ears 130, 132 of the leader block 60 and the leader block-engaging zone 180 (including the ledges 184 and the lateral support surfaces 188) causes an arc defined by the end surface 148 of the leader block assembly 60 to substantially match an arc defined by the tape-winding surface 176 of the drive take-up reel 170.

The design features of the leader block assembly 60 of the present invention have many advantages. First, as compared to prior art configurations, a greatly increased interaction surface area is provided between the leader block assembly 60 and the take-up reel 170. In particular, by configuring the leader block assembly 60 to engage the take-up reel hub 172 along a substantial portion, preferably the entire width (or height), longitudinal sliding movement and bowing of the leader block assembly 60 radially inward relative to the tape-winding surface 176 of the drive take-up reel 170 is substantially prevented. Thus, the radially inward pressure generated by the storage tape 56 as the storage tape 56 is continually wrapped around the hub 172 is statically supported by the hub 172/leader block 60 along virtually an entire width of the leader block assembly 60 such that the end surface 148 will not collapse. This larger interface surface area also prevents lateral sliding movement of the leader block assembly 60 within the slot 178.

Since the dimensions of these key components (the ears 130, 132 and the leader block engagement zone 180) are relatively small compared to the length and width dimension of the entire leader block 60 and the entire slot 178, these components can be more easily made with exacting tolerances than when one attempts to tightly control tolerances for the entire leader block 60 and the entire slot 178. Accordingly, an additional advantage is that the remaining portions of the leader block 60 and the slot 178 (particularly along their lengths) need not have as exacting tolerances, and thereby can reduce the overall costs of manufacturing the leader block 60 and the drive take up reel 170.

Additionally, the preferred smooth radius matching of the opposing corners 160, 162 (see FIG. 9) reduces strain on the storage tape 56. However, the corners 160, 162 are sufficiently close to each other to minimize any potential gap at the tape exiting area to minimize the opportunity for leader block impressions in the storage tape 56.

Accordingly, the leader block 60 in accordance with the present invention dramatically reduces the opportunity for, and prevalence of, leader block impressions in the data storage tape 56 by minimizing gaps and mismatches in a tape-winding surface of a drive take up reel that ordinarily occur adjacent a conventional leader block. In particular, the leader block 60, in association with a drive take up reel in accordance with the present invention, is supported along an entire width to substantially prevent collapse of the leader block 60 during winding operations. These improvements embodied in the leader block of the present invention reduce the costs of data storage with the data storage tape cartridges and improves their efficiency, convenience, and ease of manufacture.

Although the present invention has been described with reference to preferred embodiments, workers skilled in the art will recognize that changes can be made in form and detail without departing from the spirit of scope of the present invention. For example, the data storage tape cartridge has been depicted as including a single tape reel. Alternatively, other configurations are equally acceptable, such as a dual-reel configuration. Additionally, while the leader block assembly preferably includes a separate base block and tape clamp, a single, integrally formed leader block may be provided.

What is claimed is:

1. A leader block assembly for holding a portion of a storage tape and for use with a tape drive take-up reel, the assembly comprising:

a generally rectangular body having opposing sides, a leading end, a trailing end terminating in an end surface, and first and second ears, the ears being formed at the trailing end and extending radially relative to the sides along a substantial portion of a width of the trailing end, wherein the ears are configured to substantially prevent longitudinal sliding movement of the end surface upon insertion into a drive take-up reel.

2. The leader block assembly of claim 1, wherein the rectangular body defines a width at the end surface, and further wherein the first and second ears each include a transverse contact surface having a length that is at least 50% of the width.

3. The leader block assembly of claim 2, wherein the length of each of the transverse contact surfaces approximates the width.

4. The leader block assembly of claim 1, wherein the leader block assembly includes a base block and a tape clamp configured for reciprocal engagement to maintain a storage tape and combining to define the end surface, and further wherein the first ear extends from the base block and the second ear extends from the tape clamp.

5. The leader block assembly of claim 4, wherein the ears extend about 0.040 inches transversely from respective outer surfaces of the base block and the tape clamp.

6. The leader block assembly of claim 4, wherein the first ear has a length that is generally equal to a width of the base block, and the second ear has a length that is less than the width of the base block and generally equal to a width of the tape clamp.

7. The leader block assembly of claim 4, wherein the base block and the tape clamp combine to define an exit area at the end surface for storage tape to extend from the leader block assembly, and further wherein the base block and the tape clamp include opposing rounded surfaces at the exit area.

8. A data storage tape cartridge for use with a tape drive including a take-up reel, the data storage tape cartridge comprising:
a housing defining an enclosure;
at least one tape reel assembly disposed within the enclosure, the tape reel assembly including a hub and opposing flanges;
a storage tape wound about the hub; and
a leader block assembly secured onto a free end of the storage tape, the leader block assembly including a generally rectangular body having opposing sides, a leading end, a trailing end terminating an end surface, and first and second cars, the ears being formed at the trailing end and extending radially relative to the sides along a substantial portion of a width of the trailing end, wherein the ears are configured to substantially prevent longitudinal sliding movement of the end surface upon insertion into a drive take-up reel.

9. The data storage tape cartridge of claim 8, wherein the rectangular body defines a width at the end surface, and further wherein the first and second ears each include a transverse contact surface having a length that is at least 50% of the width.

10. The data storage tape cartridge of claim 9, wherein the length of each of the transverse contact surfaces approximates the width.

11. The data storage tape cartridge of claim 8, wherein the leader block assembly includes a base block and a tape clamp configured for reciprocal engagement to maintain the free end of the storage tape and combining to define the end surface, and further wherein the first ear extends from the base block and the second ear extends from the tape clamp.

12. The data storage tape cartridge of claim 11, wherein the ears extend about 0.040 inches transversely from respective outer surfaces of the base block and the tape clamp.

13. The data storage tape cartridge of claim 11, wherein the first ear has a length that is generally equal to a width of the base block, and the second ear has a length that is less than the width of the base block and generally equal to a width of the tape clamp.

14. The data storage tape cartridge of claim 1, wherein the base block and the tape clamp combine to define an exit area at the end surface for the storage tape to extend from the leader block assembly, and further wherein the base block and the tape clamp include opposing rounded surfaces at the exit area.

15. A combination take-up reel and leader block assembly for use in a tape drive system, the combination comprising:
a take-up reel including a hub and a pair of opposing flanges extending outwardly from the hub, the hub including an outer, tape-winding surface and a slot formed in the hub extending generally perpendicular to the tape-winding surface, the slot terminating in an engagement zone adjacent the tape-winding surface, the engagement zone including opposing transverse ledges; and
a generally rectangular-shaped leader assembly block removably insertable into the slot of the take-up reel and having a leading end, a trailing end, opposing sides, and a pair of ears positioned at the trailing end, each of the ears including a transverse contact surface extending from the sides, respectively;
wherein, upon insertion of the leader block assembly within the slot of the take-up reel, the trailing end is positioned within the engagement zone such that the transverse contact surfaces engage the radial ledges of the slot to prevent longitudinal sliding movement of the trailing end radially inwardly relative to the tape-winding surface.

16. The combination of claim 15, wherein the leader block assembly defines a width at the trailing end, and further wherein the engagement zone is configured to support the leader block assembly along at least a substantial portion of the width.

17. The combination of claim 15, wherein each of the cars further includes a lateral contact surface extending from the respective transverse contact surface, and further wherein the engagement zone further includes opposing lateral support surfaces extending from the transverse ledges, respectively, to the tape-winding surface, and further wherein the lateral contact surface have a width corresponding with a width of the lateral support surfaces.

18. The combination of claim 15, wherein the trailing end terminates in an end surface having a radius of curvature approximating a radius of curvature of the tape-winding surface.

19. The combination of claim 15, wherein the transverse ledges extend along an entire height of the hub.

20. The combination of claim 15, wherein the transverse ledges are radially spaced from the tape-winding surface.

* * * * *